Feb. 16, 1926. 1,573,586
J. M. STONE
STEERING GEAR
Filed Dec. 19, 1923  2 Sheets-Sheet 1

Inventor
J. M. Stone

By Brown & Phelps
Attorneys

Feb. 16, 1926.                              1,573,586
J. M. STONE
STEERING GEAR
Filed Dec. 19, 1923          2 Sheets-Sheet 2
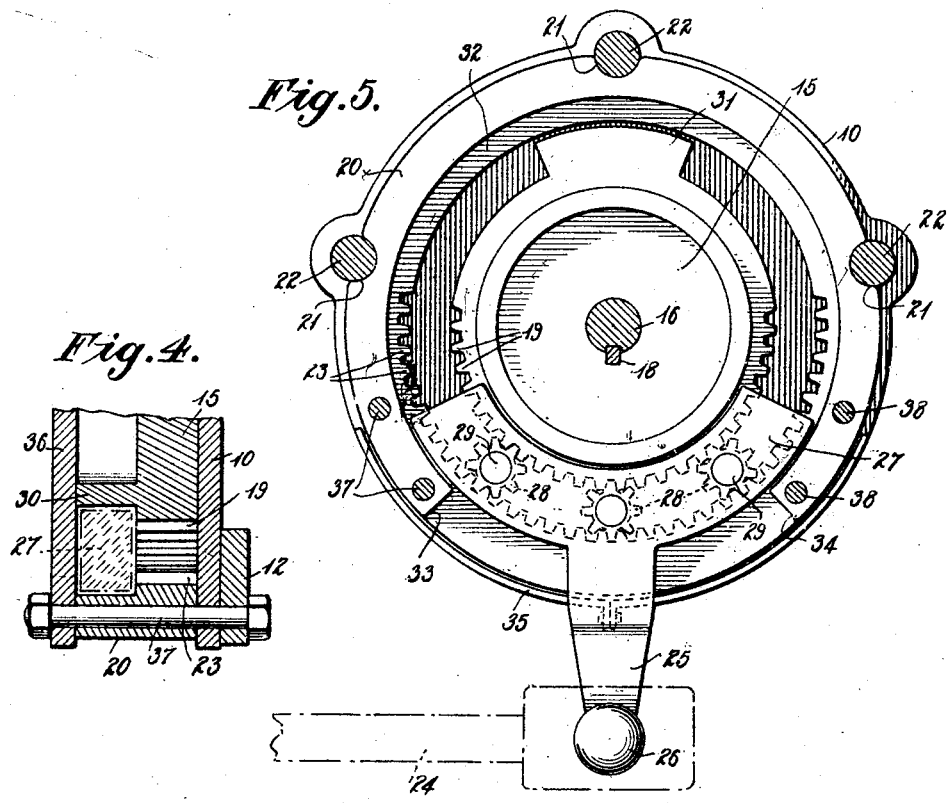
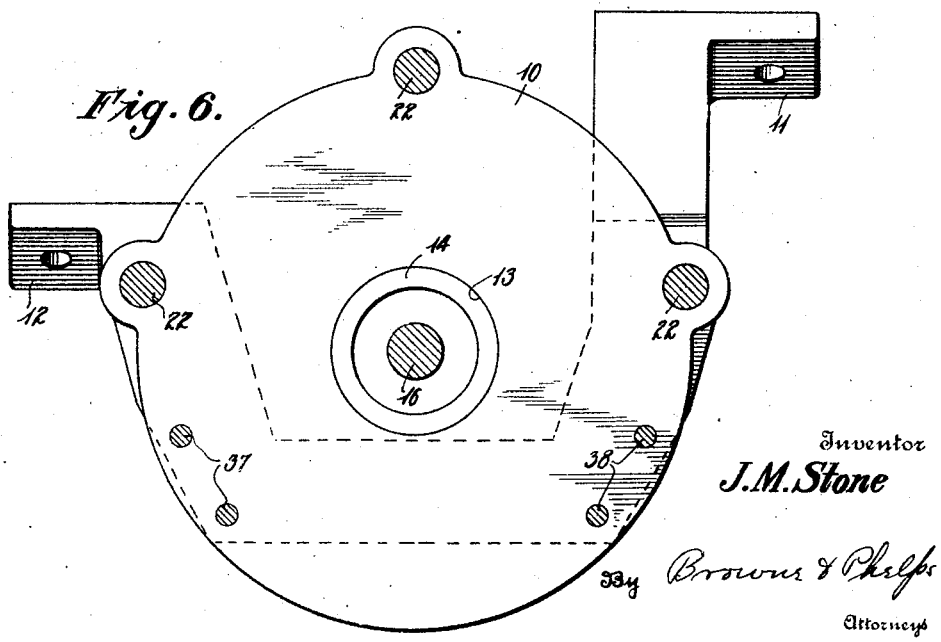
Inventor
J. M. Stone
By Browne & Phelps
Attorneys Patented Feb. 16, 1926.

1,573,586

UNITED STATES PATENT OFFICE.

JACOB M. STONE, OF BRECKENRIDGE, TEXAS.

STEERING GEAR.

Application filed December 19, 1923. Serial No. 681,517.

*To all whom it may concern:*

Be it known that I, JACOB M. STONE, a citizen of the United States, residing at Breckenridge, in the county of Stephens and State of Texas, have invented certain new and useful Improvements in Steering Gears, of which the following is a specification.

The invention relates to detachable steering gear, and has as an object the provision of a steering gear which may be attached to Ford vehicles, by attachment to the lower end of the steering post without modification of the parts supplied with the car.

A further object of the invention is the provision of steering gear which will have a powerful mechanism for controlling the steering wheels and which will resist movement backward from the wheels to the steering wheel.

A further object of the invention is the provision of a steering gear which will have an effect to prevent shimmying of the front wheels of the vehicle.

Further objects of the invention will appear from the following illustration when read with the accompanying drawing showing an illustrative embodiment of the device, and wherein Fig. 1 is a detail elevation of a portion of a chassis showing the device applied.

Fig. 4 is a detail section upon an enlarged scale taken on line 4, 4, of Fig. 2.

Fig. 5 is a section on broken line 5, 5, of Fig. 3.

Fig. 6 is a like section on line 6, 6 of Fig. 3.

Figure 1:
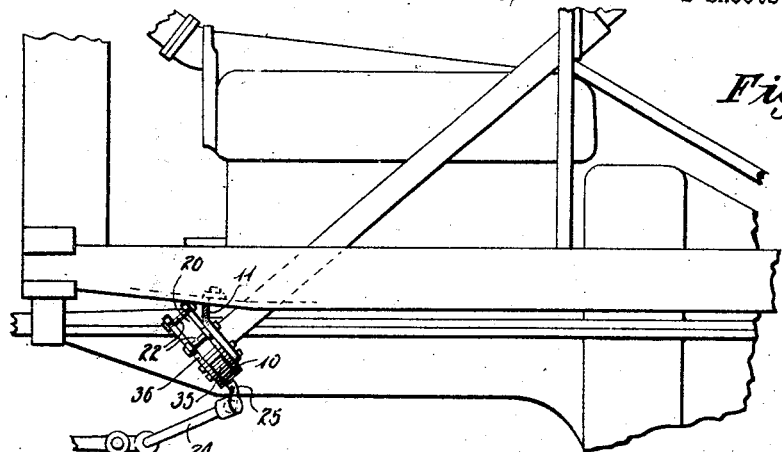
Figure 2:
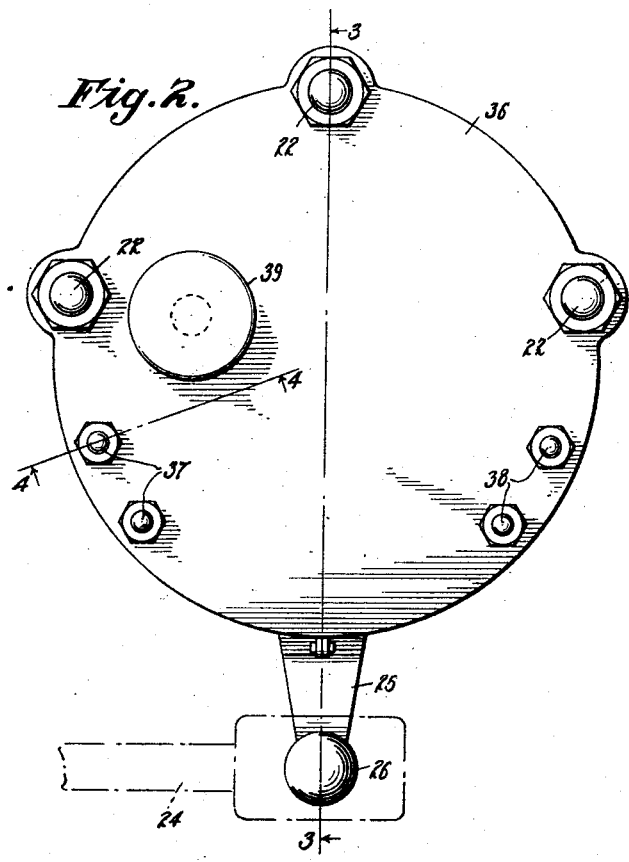
Fig. 2 is a bottom plan view of the device.
Figure 3:
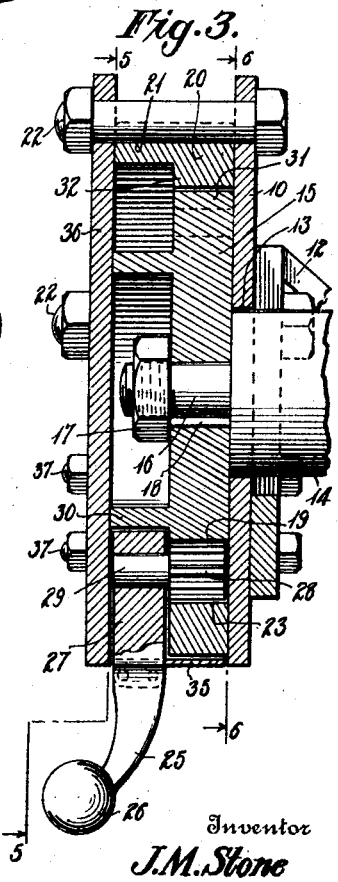
Fig. 3 is a section upon line 3, 3 of Fig. 2.

As shown, the device comprises an upper plate 10, having brackets 11, 12 securely fastened thereto, and adapted to be secured to portions of the chassis, or to the chassis and engine frame, and whereby the lower end of the steering column and the device are held rigidly in position. The center of the plate 10 is shown as provided with an opening 13 for passage of the steering post 14.

To apply power to the device from the steering wheel (not shown) a circular disk 15 is shown secured to the stud 16 upon the lower end of the steering post 14, as by means of a nut 17 and a key 18. A portion of the periphery of the disk 15, which is of substantial thickness, is shown as provided with rack teeth 19. Rigid with the plate 10, there is shown a ring 20 having recesses 21 in its periphery through which pass the bolts 22 which secure the parts together. The inner surface of the ring 20 is shown throughout a portion of its extent as provided with gear teeth 23.

To impart motion to the steering link 24, there is shown an arm 25 having a ball 26 at its end adapted to coact with the steering link. Formed integral with the arm 25, there is shown a segment 27 having a plurality of pinions 28 journaled therein, as by means of stud shafts 29 turning freely in the segment. The disk 15 is shown as provided with an annular flange 30 slightly greater in thickness than the segment 27 and adapted to steady the segment in the relative movement between the two parts. To further steady the movements of the disk 15 within the ring 20, there is shown a portion 31 projecting from the disk to a position closely adjacent the interior of the ring 20.

The thickness of the disk 15 and of the segment 27 are each shown as slightly less than one-half of the thickness of the ring 20. The rack teeth 23 are formed in the inner periphery of a shoulder 32 upon the interior of the ring 20 and the segment 27 is adapted to overlie said shoulder and to extend beyond the rack teeth 23 at the end of its movement in either direction. The upper portion of the ring 20 is cut away from the point 33 to the point 34 to permit of the passage of the arm 25 and for its swinging movement. To close the opening thus formed, there is shown a shield 35 secured to and swinging with the arm 25.

To hold the parts thus described in assembly and to close the lower portion of the mechanism, a plate 36 is shown secured to the plate 10 as by means of the bolt 22 above-referred to. In addition, bolts 37, 38 are shown passing through the ring 20 and the plates 10 and 36. If desired a grease cup, or other lubricant introducing device, may be provided upon the plate 36, as indicated at 39.

In the assembly of the device, the plate 10 is first slipped over the bottom end of the steering post after removal of the steering lever provided with the car, whereupon the disk 15 is placed upon the stud 16 and securely fastened thereto. The ring 20 is next applied and the bolts 22 may be slipped into place taking into the recesses 21 to position the ring. The segment 27 is then placed with the pinions 28 in engagement with the rack teeth 19 and 23, after which the plate 36 may be applied and bolted in place. The shield 35 may be applied at any time. The leverage provided by the planetary pinions 28 provide a very powerful control of the steering of the vehicle. With the proportions of the parts disclosed a given movement of the steering wheel will produce substantially one-half as much deflection of the front wheels of the vehicle as will the usually provided steering gear, thus giving proportionally increased power. Moreover since the road caused stresses upon the front wheel of the vehicle are applied to the steering gear through the medium of the pinions 28, which are anchored upon one side to the rack teeth 23, they will have substantially no effect upon the steering wheel, which will therefore be non-reversible. This latter effect will also greatly assist in steadying the steering of the vehicle and will render unnecessary the usual tight grip upon a Ford steering wheel.

Minor changes may be made in the physical embodiment of the invention without departing from its spirit.

I claim:

1. A steering gear comprising a disk adapted to be rigidly secured to the lower end of the steering post and having rack teeth upon its periphery, a plate adapted to be rigidly secured to the chassis of the vehicle adjacent the lower end of said steering post, an annular ring secured to said plate, rack teeth upon the inner periphery of said ring, a steering arm, a segment overlapping portions of said ring and disk and guided in its movements by other portions thereof, a steering arm rigidly secured to said segment, planetary gears journaled upon said segment and meshing with said rack teeth whereby to actuate said steering arm by movements of said disk.

2. A steering gear comprising a disk adapted to be rigidly secured to the lower end of the steering post and having rack teeth upon its periphery a plate adapted to be secured to the chassis of a vehicle adjacent the lower end of the steering post, an annular ring secured to said plate, spaced rack teeth upon the periphery of said disk and upon the inner periphery of said ring a segment, a steering arm projecting from said segment, planetary gearing journaled upon said segment coacting with said rack teeth, the thickness of said ring being slightly in excess of the combined thickness of said segment and disk, an annular flange projecting from a face of said disk to steady said segment, said ring having a recess for passage of and to permit movements of said steering arm, and a bottom cover plate secured to said ring.

3. A steering gear comprising, in combination, a disk adapted to be secured to the steering column and having gear teeth about a portion of its periphery, a ring having internal gear teeth thereon, a portion of said ring of less radial extent projecting above said gear teeth to provide an annular internal angle, a segment having a thickness slightly less than the last-mentioned portion of the ring traveling in said angle, a steering arm carried by said segment, pinions journaled in said segment and meshing with said gear teeth, and a cover plate to retain said segment whereby revolution of said disk may cause movement of translation of said steering arm.

4. A plate adapted to be secured adjacent a steering column concentric therewith, a ring secured to said plate having a portion of its height of greater radial extent than the remainder thereof and internal gear teeth carried by said first named portion, a disk adapted to be rigidly secured to a steering column and having gear teeth upon its periphery in spaced relation to said first named gear teeth, said disk having an annular flange projecting from its surface in spaced relation to the plane portion of said ring, a segment adapted to travel between said last referred to portions of said ring and said annular flange, pinions journaled in said segment and meshing with said gear teeth whereby revolution of the steering column may cause movement of translation of said segment, a steering arm carried by said segment, a portion of the thinner portion of said ring being cut away to provide a recess for the reception of said steering arm, and a segmental projection upon said disk to coact with the inner surface of said ring to preserve the concentric relation thereof.

5. A steering arm comprising, in combination, a plate adapted to be rigidly secured adjacent a steering column and having a concentric opening for passage of the column, a ring carried by said plate having a reduced radial extent through a portion of its height to provide an internal angle, a portion of said reduced portion being cut away to provide a recess in the margin of said ring, a disk adapted to be rigidly secured to the steering column, gear teeth upon the periphery of said disk and upon the periphery of said ring, a segment having pinions journaled therein and adapted to travel in said internal angle, a steering arm carried by said segment projecting through said recess, an arcuate shield mounted upon said steering arm to close the unoccupied portions of said recess, and a cover plate to retain said segment in place.

JACOB M. STONE.